United States Patent [19]

Humke et al.

[11] Patent Number: 5,431,532
[45] Date of Patent: Jul. 11, 1995

[54] BLADE CONTAINMENT SYSTEM

[75] Inventors: Brian J. Humke; Robert P. Czachor, both of Cincinnati; Donald L. Bellia; Eric E. Baehre, both of West Chester; Christopher C. Glynn, Hamilton, all of Ohio

[73] Assignee: General Electric Company, Cincinnati, Ohio

[21] Appl. No.: 247,741

[22] Filed: May 20, 1994

[51] Int. Cl.$^6$ ............................................. F04D 29/40
[52] U.S. Cl. ......................................................... 415/9
[58] Field of Search ............................................ 415/9

[56] References Cited

U.S. PATENT DOCUMENTS

| | | | |
|---|---|---|---|
| 4,149,824 | 4/1979 | Adamson | 415/9 |
| 4,425,080 | 1/1984 | Stanton et al. | 415/9 |
| 4,534,698 | 8/1985 | Tomich | 415/9 |
| 5,050,385 | 9/1991 | Hirose et al. | |
| 5,188,505 | 2/1993 | Schilling et al. | 415/9 |
| 5,336,044 | 8/1994 | Forrester | 415/9 |
| 5,344,280 | 9/1994 | Langenbrunner et al. | 415/9 |

*Primary Examiner*—John T. Kwon
*Attorney, Agent, or Firm*—Jerome C. Squillaro; Bernard E. Shay

[57] ABSTRACT

A blade containment system is disclosed which includes an annular casing positioned radially outward of the blades and in surrounding relationship therewith, the annular casing including a plurality of composite tapes bonded to the outer or inner radial surfaces thereof, wherein the composite tapes limit the propagation of cracks and holes formed in the annular casing.

20 Claims, 7 Drawing Sheets

BLADE CONTAINMENT SYSTEM

BACKGROUND OF THE INVENTION

1. Field of the Invention

The present invention relates to a blade containment system for a gas turbine engine, and, more particularly, to a blade containment system including an annular casing having a plurality of composite tapes bonded thereto in order to limit the propagation of cracks and holes formed in the annular casing.

2. Description of Related Art

Conventional high bypass ratio turbofan engines, which are included in the more general category of gas turbine engines and which may be used for aircraft propulsion, typically include a fan, booster, high pressure compressor, combustor, high pressure turbine, and low pressure turbine in serial axial flow relationship about a longitudinal centerline axis of the engine. The high pressure turbine is drivingly connected to the high pressure compressor via a first rotor shaft, and the low pressure turbine is drivingly connected to both the fan and booster via a second rotor shaft. The fan includes an annular disk and a plurality of radially extending blades mounted on the disk, wherein the disk and the blades are rotatable about the longitudinal centerline of the engine. The engine further includes an annular fan casing which surrounds the blades in radially spaced relationship.

Gas turbine engines typically operate at relatively high rotational speeds and, for high bypass ratio turbofans, the fan blades typically include a relatively large radially extending length. Consequently, the fan blades possess relatively high kinetic energy even when the blades are fabricated using lightweight alloys or composite materials. Containment of fan blades has been a continuing problem for the industry, as various known events may occur during engine operation, such as blade contact with foreign or domestic objects, which may cause a blade to be released from the fan disk.

In order to prevent such fan blades or fragments thereof from penetrating the annular fan casing, various containment systems have been employed. While such containment systems have included the use of an annular fan casing manufactured from a high strength material with an adequate radially extending shell thickness to absorb the kinetic energy of the impacting fan blade, more recent containment systems have employed various nesting areas defined by inner and outer annular casings which may include honeycomb structures therein. In addition, ballistic material may be wrapped around the fan casing outer surface. An example of such a blade containment structure is found in U.S. Pat. No. 4,534,698 to Tomich.

It has been found that once a hole or crack has been formed in the inner casing of such prior art fan containment casings that such cracks propagate throughout the inner casing. Because the inner casing is the primary load carrying structure of the fan containment case, the size of such a crack or hole caused during a fan blade-out event must be minimized. By doing so, the overturning moment imparted on the engine structure is minimized since the fan case acts as a "journal bearing" for the fan during spool-down of the engine after a blade-out event, whereby the rubbing action of the fan on the case reduces the orbiting of the fan rotor and therefore the overturning moment on the engine structure. Moreover, a large hole or crack in the inner casing reduces its ovalization stiffness, and may allow the fan to orbit into the hole if the hole becomes too large. Additionally, an unarrested crack may propagate to a point where the fan cowl and containment case become detached from the engine, which is unacceptable.

SUMMARY OF THE INVENTION

In accordance with one aspect of the present invention, a blade containment system is disclosed which includes an annular casing positioned radially outward of the blades and in surrounding relationship therewith, the annular casing including a plurality of composite tapes bonded on the outer radial surface or inner radial surface thereof, wherein the composite tapes limit the propagation of cracks and holes formed in the annular casing.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
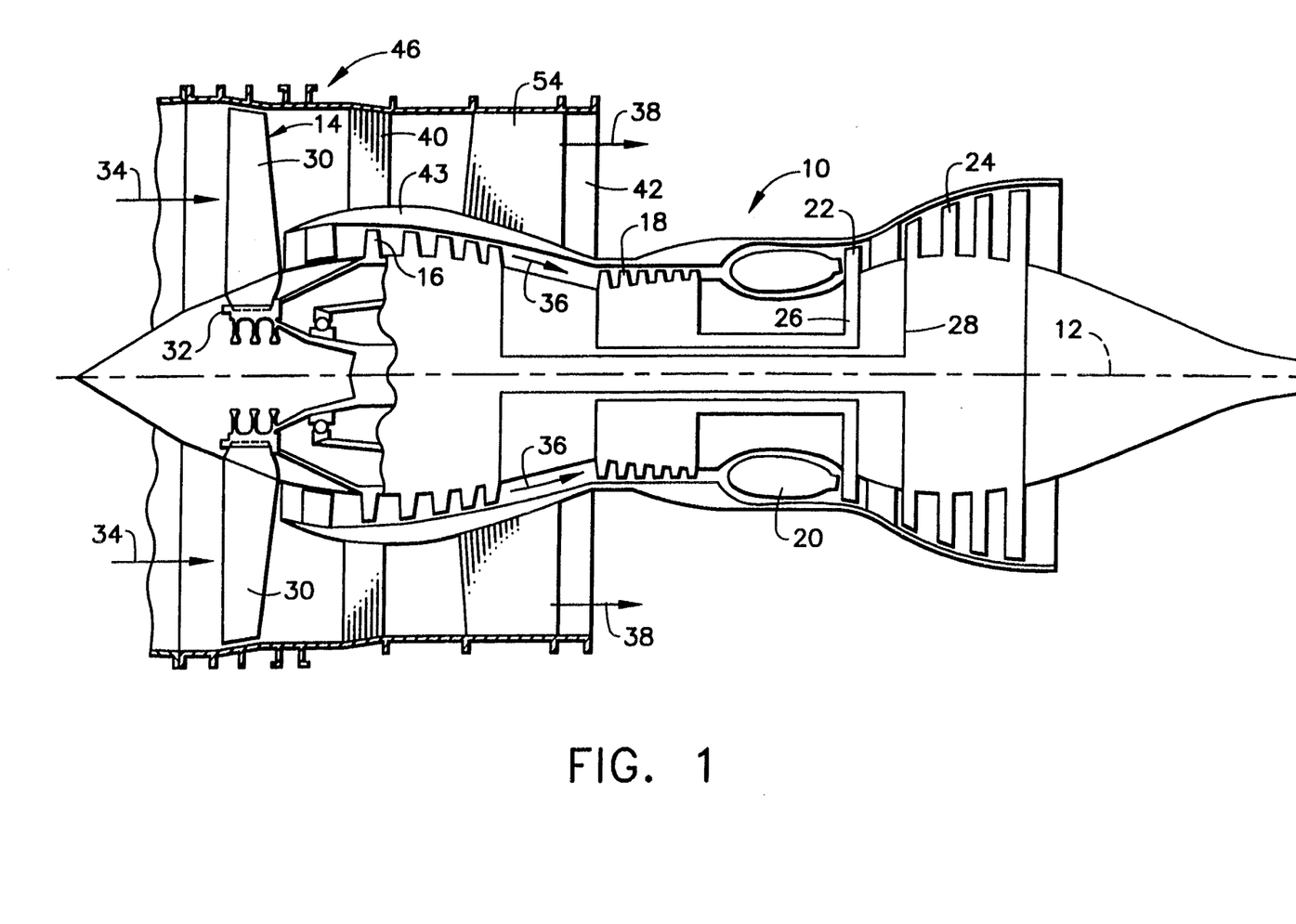
FIG. 1 is a longitudinal cross-sectional view illustrating an exemplary high bypass ratio turbofan engine incorporating the blade containment system of the present invention.

Referring now to the drawings in detail, wherein identical numerals indicate the same elements throughout the figures, FIG. 1 illustrates a longitudinal cross-sectional view of an exemplary high bypass ratio turbofan engine 10. The engine 10 includes, in serial axial flow communication about a longitudinal centerline axis 12, conventional structures including a fan rotor 14, booster 16, high pressure compressor 18, combustor 20, high pressure turbine 22, and low pressure turbine 24.

High pressure turbine 22 is drivingly connected to high pressure compressor 18 with a first rotor shaft 26 and low pressure turbine 24 is drivingly connected to both the booster 16 and fan rotor 14 with a second rotor shaft 28. Fan rotor 14 comprises a plurality of radially extending blades 30 mounted on an annular disk 32, wherein disk 32 and blades 30 are rotatable about the longitudinal centerline axis 12 of engine 10.

During operation of engine 10, ambient air 34 enters the engine inlet and a first portion, denoted the primary gas stream 36, passes through fan rotor 14, booster 16 and high pressure compressor 18, being pressurized by each component in succession. Primary gas stream 36 then enters combustor 20 where the pressurized air is mixed with fuel to provide a high energy gas stream. The high energy gas stream then enters in succession high pressure turbine 22 where it is expanded, with energy extracted to drive high pressure compressor 18, and low pressure turbine 24 where it is further expanded, with energy being extracted to drive fan rotor 14 and booster 16. A second portion of ambient air 34, denoted the secondary or bypass airflow 38, passes through fan rotor 14 and fan outlet guide vanes 40 before exiting the engine through annular duct 42, wherein secondary airflow 38 provides a significant portion of the engine thrust.

Figure 2:
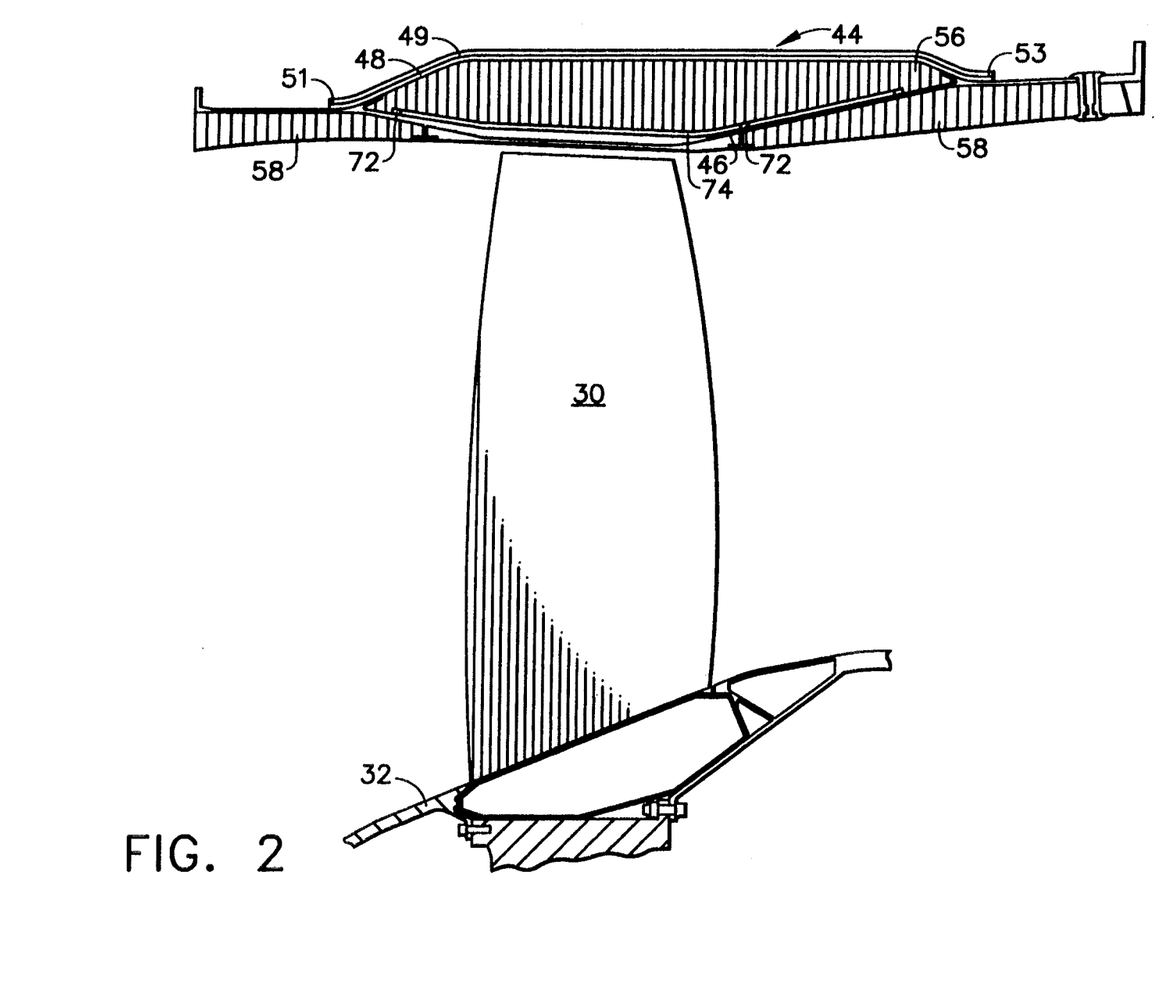
FIG. 2 is an enlarged fragmentary longitudinal cross-sectional view illustrating the blade containment system of the present invention in relation to a fan blade.

FIG. 2 is an enlarged fragmentary longitudinal cross-sectional view of the engine of FIG. 1 illustrating the blade containment system, generally depicted at 44, of the present invention. The blade containment system 44 comprises an inner annular casing 46 which is positioned radially outward of blades 30 and in surrounding relationship therewith (one of which is shown in FIG. 2). An outer shell 48 is spaced radially outward of casing 46 and is attached to annular casing 46 at upstream and downstream axial ribs 50 and 52 (see FIG. 4) to define a chamber 55 therebetween. It will be noted that ribs 50 and 52 are configured so as to enhance the bonding of outer shell 48 to inner annular casing 46. Preferably, ribs 50 and 52 are at angles $\alpha$ and $\beta$, respectively, to inner annular casing 46 so as to match axial ends 51 and 53 of outer shell 48 and maximize the surface connection therebetween. Chamber 55, which is also known as a nesting area, preferably includes a honeycomb structure 56 (shown in FIG. 2) which is used to retain broken blades or blade fragments therein. A ballistic material 49, such as KEVLAR ®, is positioned radially outward of the outer shell 48 and honeycomb structure 56.

Further, acoustic panels 58 are affixed to an inner surface 60 of annular casing 46 and disposed axially between blades 30 and outlet guide vanes 40, where it forms a portion of an outer boundary for the flow of bypass airflow 38 through annular duct 42. The inner boundary of duct 42 is formed by core cowling 43. Fan outlet guide vanes 40 extend across annular duct 42, being connected at an outer end to inner annular casing 46 and at an inner end to core cowling 43, for the purpose of removing swirl from airflow 38 in a conventional manner. A plurality of structural support struts 54 (shown in FIG. 1) extend radially across annular duct 42 and are attached at an outer end to casing 46 and at an inner end to core cowling 43, thereby providing a structural link between cowling 43 and inner annular casing 46.

Annular casing 46 includes a section 62 which is axially aligned with fan blade 30. Section 62, known as a skating surface, preferably does not include acoustic panels on the radially inward surface thereof, but instead has placed thereon an abradable material 66 in order to provide the best possible fit between blade 30 and annular casing 46.

Figure 3:
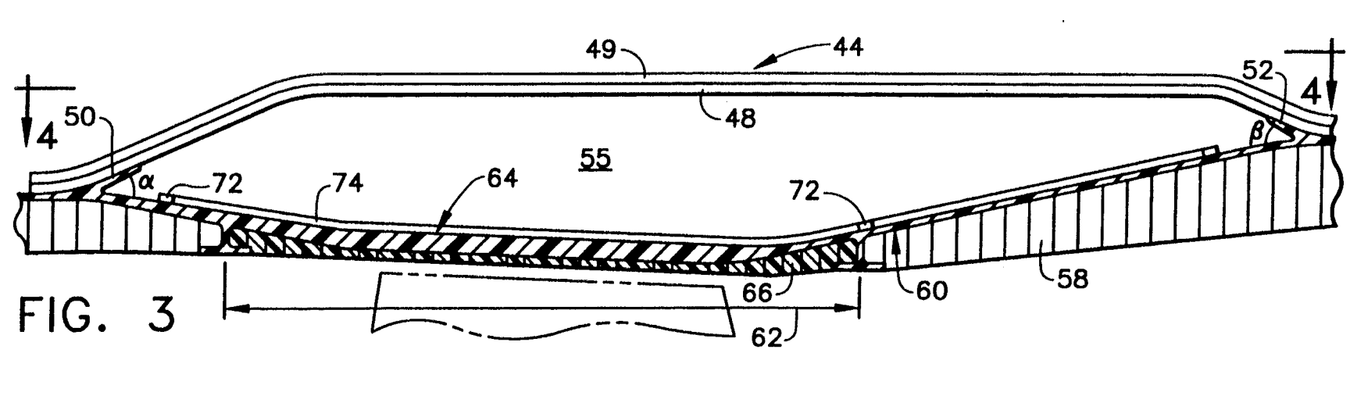
FIG. 3 is a further enlarged longitudinal cross-sectional view illustrating a blade containment system according to the present invention having composite tapes bonded to the outer radial surface.
Figure 3A:
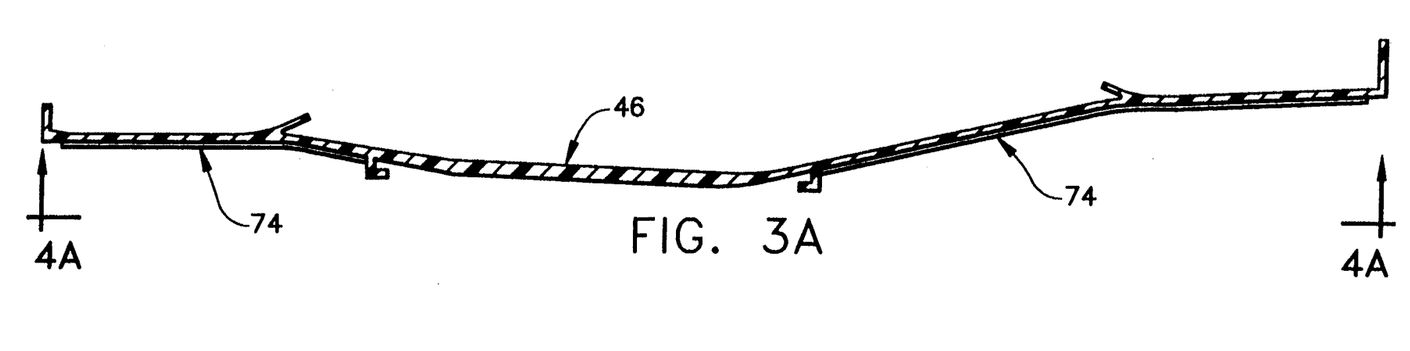
FIG. 3A is an enlarged longitudinal cross-sectional view illustrating an alternative blade containment system according to the present invention having composite tapes bonded to the inner radial surface.

In order to limit the propagation of cracks and holes formed therein, annular casing 46 includes a plurality of crack arresters in the form of composite tapes bonded to the outer surface 64 thereof. Such composite tapes include tapes 72 which are circumferentially oriented with respect to the longitudinal axis 12 in order to limit axial propagation of such cracks and holes, while tapes 74 are provided which are axially oriented with respect to longitudinal axis 12 to limit circumferential propagation of cracks and holes. Tapes 72 and 74 are bonded to the outer surface 64, or as shown in FIG. 3A to the inner surface, of annular casing 46 by means of a film adhesive.

Preferably, the film adhesive utilized (e.g., AF163 from 3M Company) is more ductile than the composition of tapes 72 and 74 in order to provide a shock absorbing layer between annular casing 46 and tapes 72 and 74 during impact by a blade or blade fragment. Accordingly, tapes 72 and 74 are able to redirect loads on inner annular casing 46 since they are not integral therewith (thereby leaving tapes 72 and 74 less susceptible to damage). For example, even if a crack is able to propagate beyond (or under) tapes 72 and 74 in inner annular casing 46, tapes 72 and 74 are able to absorb and redirect loads by, in essence, providing a stitch across the crack. Tapes 72 and 74 are preferably of a composite construction, where a plastic matrix includes a plurality of reinforcing fibers 75 therein (see FIG. 5). Fibers 75 are preferably positioned unidirectionally along longitudinal axes $a_1$ and $a_2$ of tapes 72 and 74, respectively. In order to strengthen such tapes, an epoxy matrix preferably is impregnated therein. Exemplary fiberglass tapes are available commercially from Minnesota Mining & Manufacturing (3M) Company of Minneapolis, Minnesota under the commercial name of S Glass unidirectional fiberglass tape. Composite tapes including graphite fibers may also be utilized.

Figure 7:
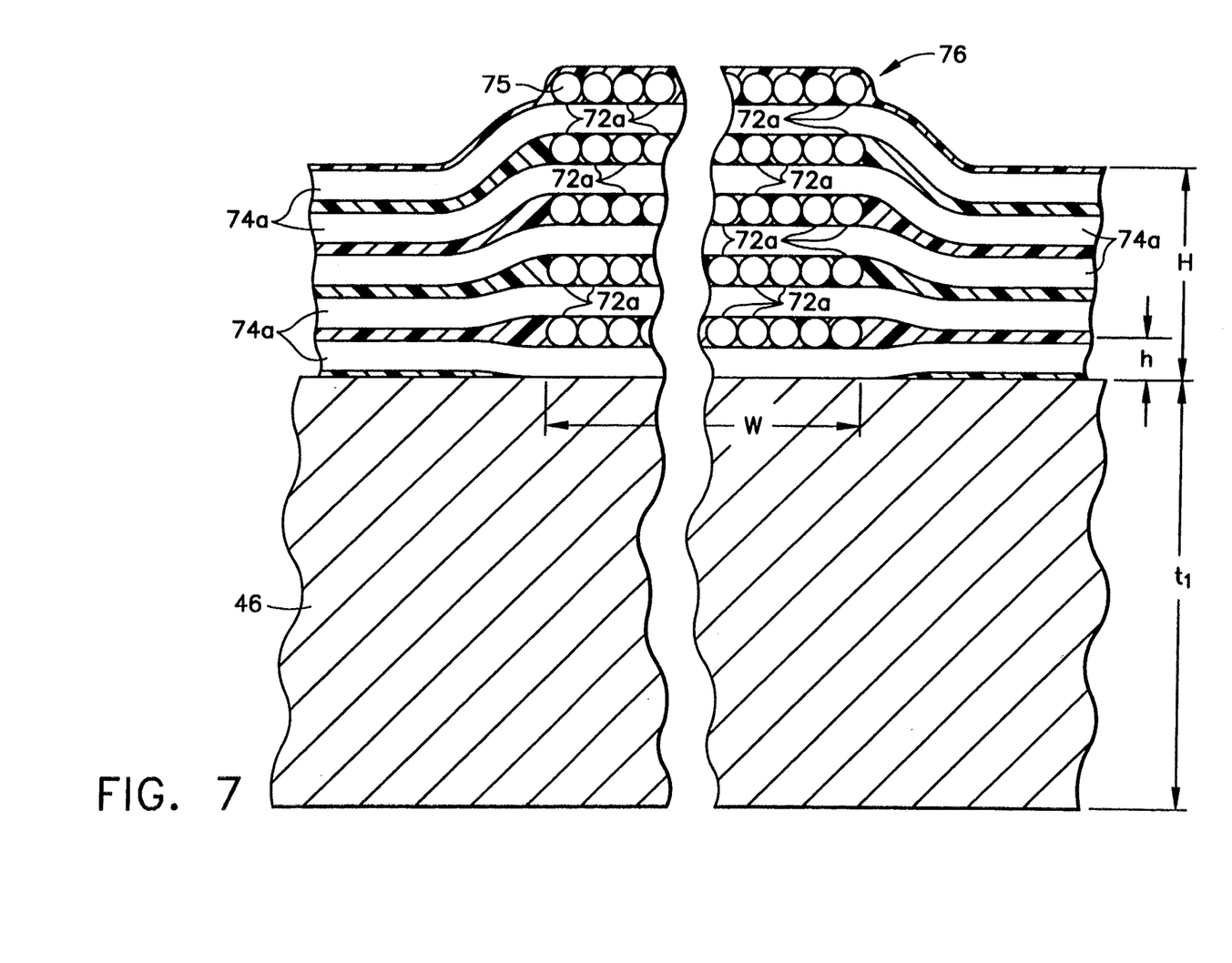
FIG. 7 is an enlarged partial cross-sectional view of the inner annular fan casing with the composite tapes bonded thereon.

It will be seen best from FIG. 7 that annular casing 46 has a thickness $t_1$, and tapes 72 and 74 have a width w and thickness H. Preferably, the width w of tapes 72 and 74 is greater than and preferably 20 times the thickness H (see FIG. 7). Height H is the total thickness of composite tapes 72 and 74, constructed as several plies or layers having individual thickness h of approximately 10 mils.

Figure 4:
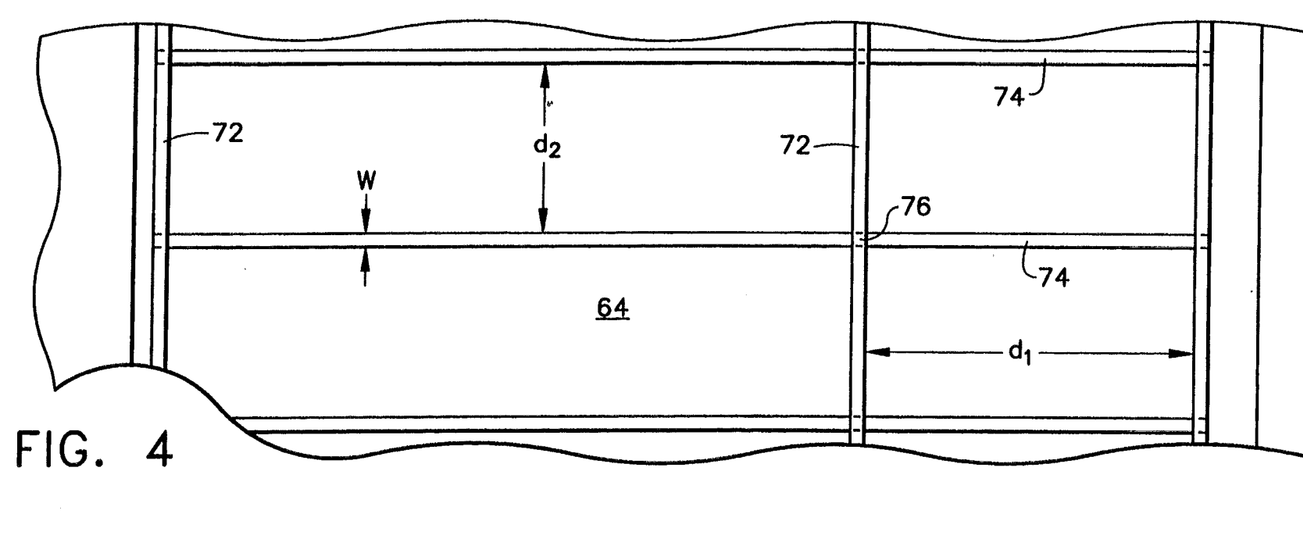
FIG. 4 is a top view of the inner annular fan casing of the blade containment system taken along line 4—4 in FIG. 3, where the outer shell and honeycomb structure have been removed for clarity.
Figure 4A:
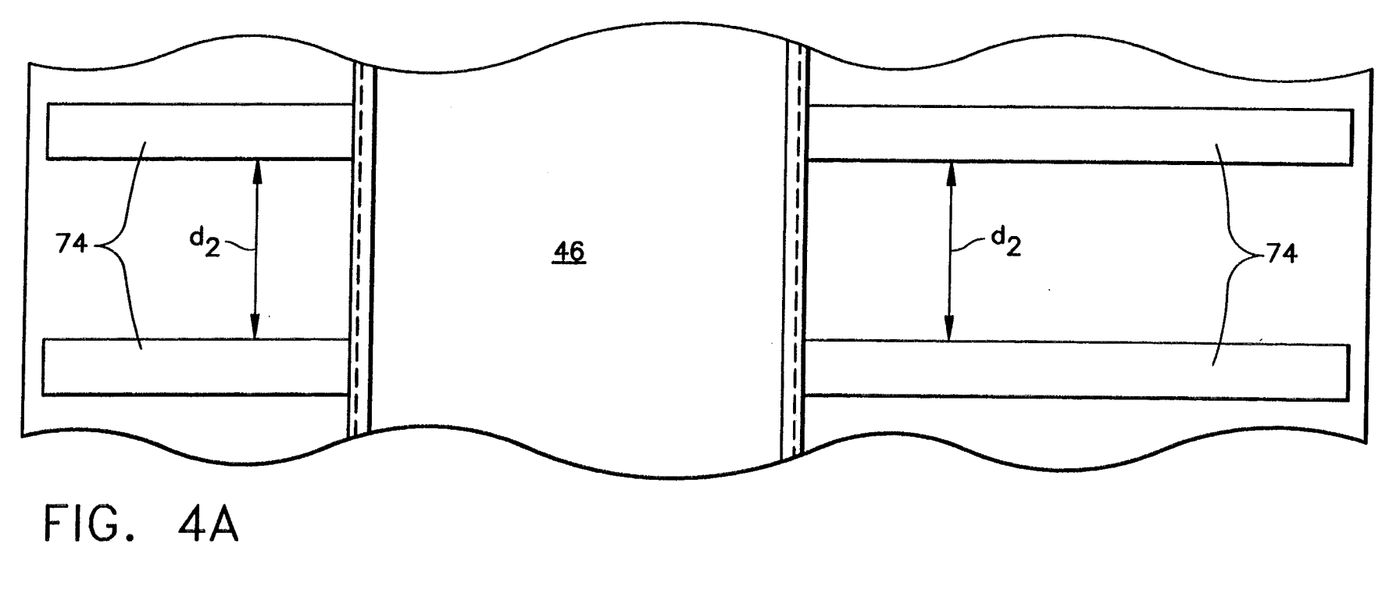
FIG. 4A is a plan view taken along line 4A—4A of FIG. 3A.
Figure 5:
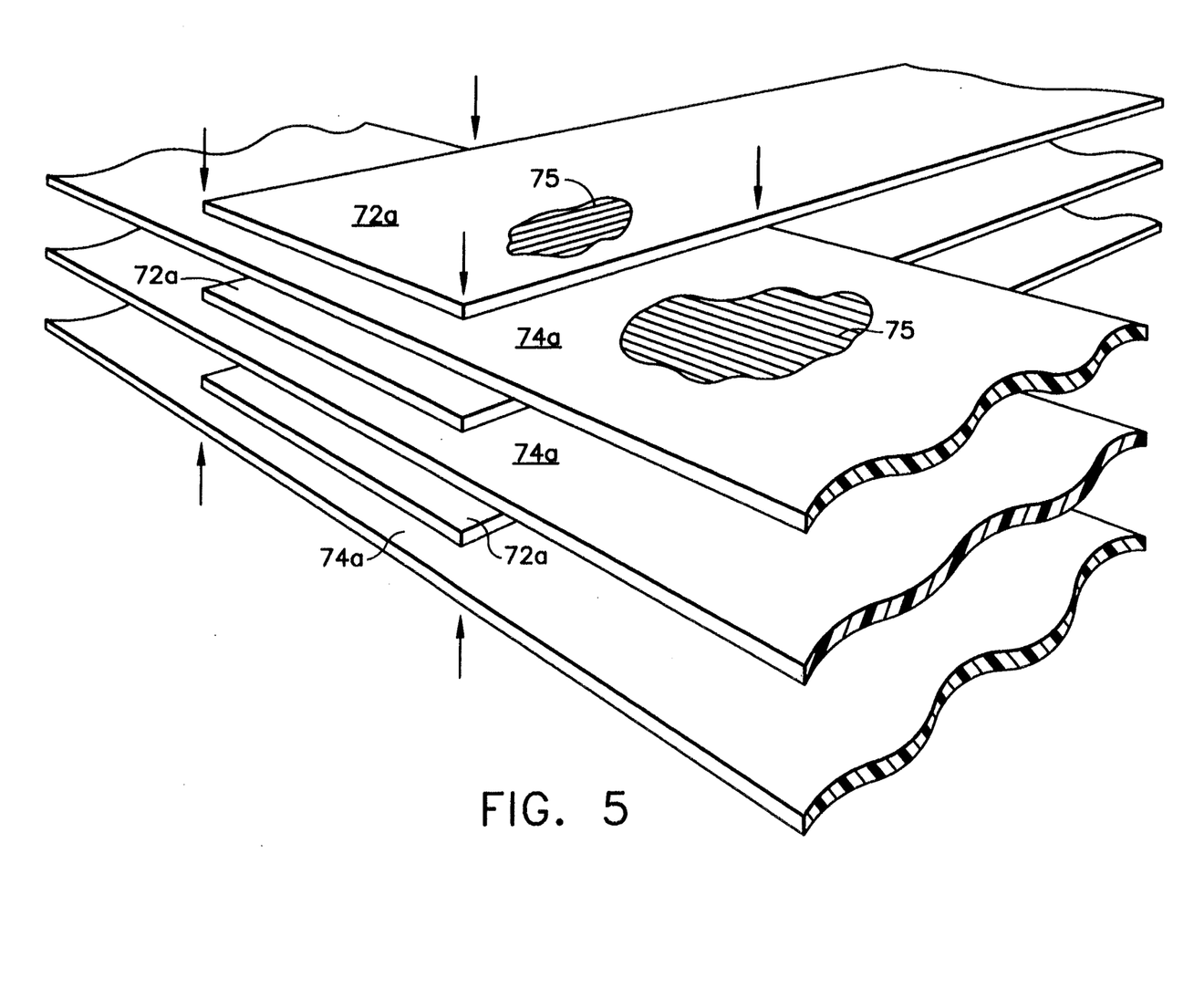
FIG. 5 is a fragmentary exploded view of a plurality of composite tape plies utilized in the blade containment system of the present invention, where fragments of such plies are broken away to expose the fibers therein.

As best seen in FIGS. 4, 5 and 7, circumferential tapes 72 intersect axial tapes 74 to form junctions 76, also known as nodes. Although circumferential tapes 72 and axial tapes 74 can be arranged to have varying distances therebetween—$d_1$ defines the distance between circumferential tapes 72 and $d_2$ defines the distance between axial tapes 74—these tapes are preferably arranged to form squares having sides of approximately 4 inches. However, in order to ensure that blades or blade fragments properly penetrate annular casing 46 as desired, it is preferred that circumferential tapes 72 not be provided within axial section 62 as shown in FIG. 4. This also minimizes any bonding problems for honeycomb 56 to inner annular casing 46.

It is important to note that the width w and thickness H of tapes 72 and 74, as well as their arrangement with respect to each other, are meant only to limit the propagation of cracks and holes formed in annular casing 46. Therefore, width w and thickness H of tapes 72 and 74 and distances $d_1$ and $d_2$ should be based on the hole size that is allowable for the case to maintain adequate structural function following a blade impact event.

As mentioned above, a plurality of plies 72a and 74a are preferably utilized to construct tapes 72 and 74. In this design, circumferential plies 72a and axial plies 74a are alternated (see FIGS. 5 and 7), where the ply adjacent inner annular casing 46 is bonded thereto by film adhesive as described above, and subsequent plies are bonded to plies on both sides thereof. Accordingly, not only do circumferential and axial tapes 72 and 74 have several plies, but junctions 76 do so as well. This increases the strength of junctions 76 dramatically, which is particularly important for those junctions adjacent axial section 62 since no circumferential tape 72 lies therewithin. In addition, it allows the individual plies of a tape to pull out of a junction 76 instead of causing a complete rupture of the intersecting tape as well.

Figure 6:
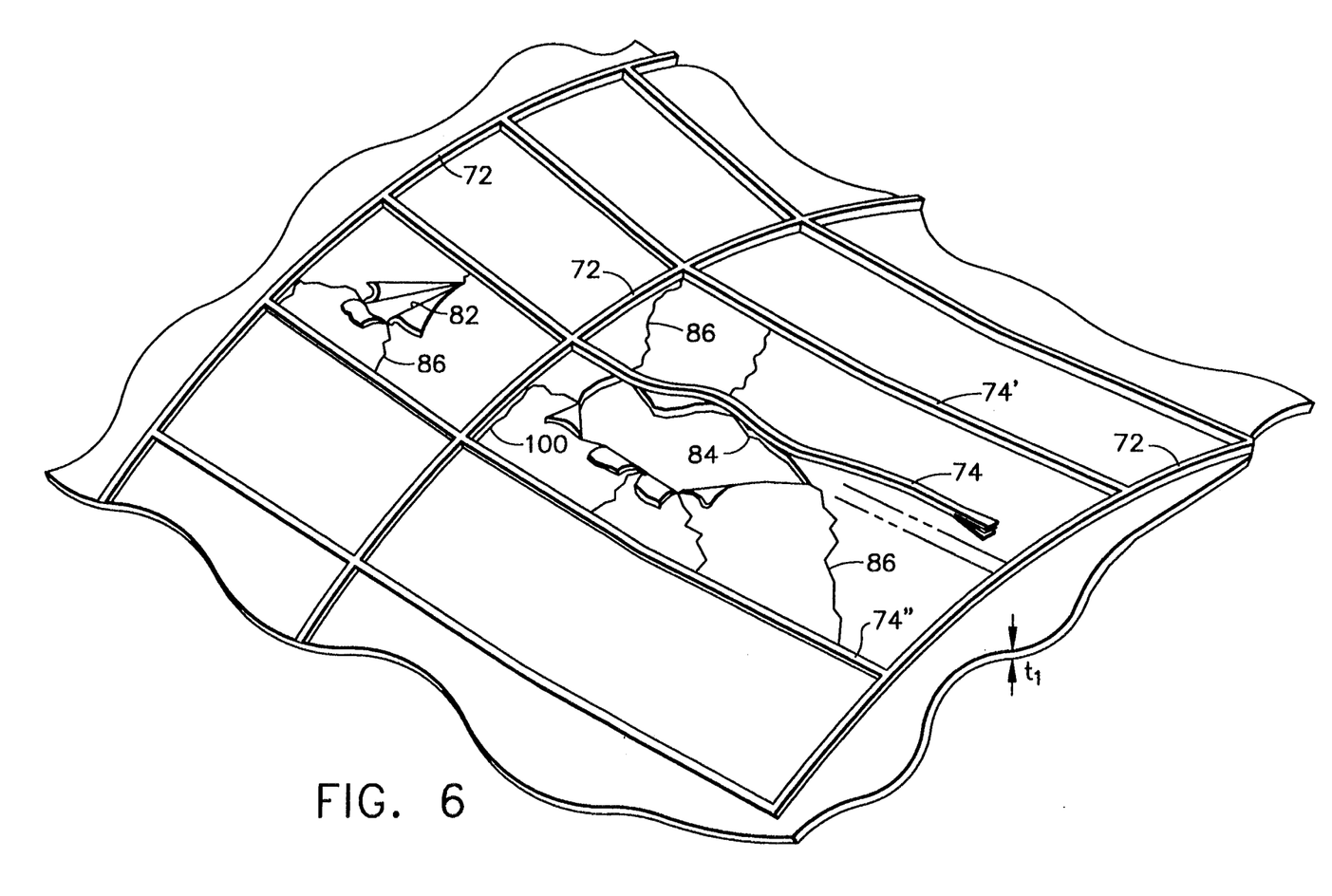
FIG. 6 is a fragmentary perspective view of the outer surface of the inner annular fan casing depicted in FIG. 4, where holes and cracks have been formed therein.

As best seen in FIG. 6, wherein holes 82 and 84 have been made in annular casing 46 by means of a blade or blade fragment, it can be seen that composite tapes 72 and 74 limit the propagation of cracks 86 in the axial and circumferential directions, respectively, by turning them as the cracks approach such tapes. This not only confines the propagation of such cracks within a defined area, but also limits cracks 100 from connecting holes 82 and 84 to form a much larger hole. For example, FIG. 6 shows axial tapes 74 being pulled off outer surface 64 of inner annular casing 46, but circumferential tape 72 and adjacent axial tapes 74' and 74" are maintained to arrest cracks 86.

Having shown and described the preferred embodiment of the present invention, further adaptations of the blade containment system can be accomplished by appropriate modifications by one of ordinary skill in the art without departing from the scope of the invention.

What is claimed is:

1. In a gas turbine engine having a plurality of radially extending blades mounted on an annular disk, the blades and disk being rotatable about a longitudinal axis of the engine, a blade containment system comprising an annular casing positioned radially outward of the blades and in surrounding relationship therewith, said annular casing including a plurality of composite tapes bonded to a radial surface thereof, wherein said composite tapes limit the propagation of cracks and holes formed in said annular casing.

2. The blade containment system of claim 1, wherein said composite tapes are circumferentially oriented with respect to said longitudinal axis to limit axial propagation of said cracks.

3. The blade containment system of claim 2, wherein said circumferential tapes include a plurality of layered plies.

4. The blade containment system of claim 1, wherein said composite tapes are axially oriented with respect to said longitudinal axis to limit circumferential propagation of said cracks.

5. The blade containment system of claim 4, wherein said circumferential tapes include a plurality of layered plies.

6. The blade containment system of claim 1, wherein at least one of said composite tapes is axially oriented with respect to said longitudinal axis and at least one of said composite tapes is oriented circumferentially with respect to said longitudinal axis.

7. The blade containment system of claim 6, wherein junctions are formed by each intersection of said circumferential tapes and said axial tapes, the distance between each adjacent junction being approximately four inches.

8. The blade containment system of claim 6, each of said circumferential tapes and axial tapes including a plurality of layered plies, wherein junctions are formed by each intersection of said circumferential and axial tapes by alternating plies of said circumferential and axial tapes.

9. The blade containment system of claim 8, wherein said junctions have a height approximately one-half of a thickness of said inner annular casing.

10. The blade containment system of claim 1, wherein each of said composite tapes is bonded to a radially outer surface of said annular casing and has a width approximately twenty times its thickness.

11. The blade containment system of claim 1, wherein each of said composite tape is bonded to a radially inner surface of said annular casing and has a width approximately twenty times its thickness.

12. The blade containment system of claim 1, further including an outer shell which is spaced radially outward of said annular casing and is attached to said annular casing at first and second axial ribs to define a chamber therebetween.

13. The blade containment system of claim 12, wherein none of said composite tapes is oriented circumferentially within said axial section of said annular casing.

14. The blade containment system of claim 1, said annular casing including a section axially aligned with said blades having an axial length approximating a chord size of said blades.

15. The blade containment system of claim 14, further including acoustic panels radially inward of said annular casing and axially outside said axial annular casing section.

16. The blade containment system of claim 14, further including an abradable material attached to a radially inner surface of said annular casing within said axial section.

17. The blade containment system of claim 1, said composite tapes having a thickness approximately equal to a thickness of said annular casing.

18. The blade containment system of claim 1, wherein said composite tapes include unidirectional reinforcing fibers therein.

19. The blade containment system of claim 18, wherein said reinforcing fibers are parallel to a longitudinal axis for each of said composite tapes.

20. A blade containment system for a fan of a gas turbine engine, said fan including blades and a disk rotatable about a longitudinal axis of the engine, comprising:

an annular fan casing positioned radially outward of the fan blades and in surrounding relationship therewith, said annular casing including a plurality of composite tapes bonded to a radial surface thereof, said composite tapes including a plurality oriented axially and a plurality oriented circumferentially with respect to said longitudinal axis, wherein said composite tapes limit the propagation of cracks and holes formed in said annular casing.

* * * * *